US010472515B2

(12) United States Patent
Lu et al.

(10) Patent No.: US 10,472,515 B2
(45) Date of Patent: Nov. 12, 2019

(54) BIODEGRADABLE POLYESTER COMPOSITION

(71) Applicants: Kingfa Sci. & Tech. Co., Ltd., Guangzhou, Guangdong (CN); Zhuhai Wango Chemical Co., Ltd., Zhuhai, Guangdong (CN)

(72) Inventors: Changli Lu, Guangdong (CN); Zhimin Yuan, Guangdong (CN); Tongmin Cai, Guangdong (CN); Xianbo Huang, Guangdong (CN); Xiangbin Zeng, Guangdong (CN); Jian Jiao, Guangdong (CN); Renxu Yuan, Guangdong (CN); Yuke Zhong, Guangdong (CN); Kai Xiong, Guangdong (CN); Hui Yang, Guangdong (CN); Kaijin Mai, Guangdong (CN); Xueteng Dong, Guangdong (CN)

(73) Assignees: Kingfa Sci. & Tech. Co., Ltd. (CN); Zhuhai Wango Chemical Co., Ltd. (CN)

( * ) Notice: Subject to any disclaimer, the term of this patent is extended or adjusted under 35 U.S.C. 154(b) by 0 days.

(21) Appl. No.: 15/580,173

(22) PCT Filed: Mar. 1, 2017

(86) PCT No.: PCT/CN2017/075357
§ 371 (c)(1),
(2) Date: Dec. 6, 2017

(87) PCT Pub. No.: WO2018/014560
PCT Pub. Date: Jan. 25, 2018

(65) Prior Publication Data
US 2018/0298187 A1 Oct. 18, 2018

(30) Foreign Application Priority Data
Jul. 22, 2016 (CN) .......................... 2016 1 0583504

(51) Int. Cl.
C08L 67/02 (2006.01)
C08K 5/101 (2006.01)
C08K 13/02 (2006.01)
C08L 3/02 (2006.01)
C08L 67/04 (2006.01)
C08G 63/183 (2006.01)

(52) U.S. Cl.
CPC ............ *C08L 67/02* (2013.01); *C08G 63/183* (2013.01); *C08K 5/101* (2013.01); *C08K 13/02* (2013.01); *C08L 3/02* (2013.01); *C08L 67/04* (2013.01); *C08G 2230/00* (2013.01); *C08L 2201/06* (2013.01); *C08L 2201/08* (2013.01); *C08L 2205/025* (2013.01); *C08L 2205/03* (2013.01)

(58) Field of Classification Search
CPC ....................................................... C08L 67/02
See application file for complete search history.

(56) References Cited

U.S. PATENT DOCUMENTS

2003/0187149 A1* 10/2003 Schmidt .................. C08L 67/02
525/418
2012/0316257 A1* 12/2012 Bastioli .................. C08G 63/16
521/182
2013/0147087 A1* 6/2013 Huang ..................... A46D 1/00
264/178 R

FOREIGN PATENT DOCUMENTS

| CN | 102639594 A | 8/2012 |
| CN | 103687902 A | 3/2014 |
| CN | 104479304 A | 4/2015 |
| CN | 104744898 A | 7/2015 |
| CN | 106084681 A | 11/2016 |

OTHER PUBLICATIONS

International Search Report for Application No. PCT/CN2017/075357 dated Jun. 7, 2017.

* cited by examiner

*Primary Examiner* — Michael F Pepitone
(74) *Attorney, Agent, or Firm* — Lerner, David, Littenberg, Krumholz & Mentlik, LLP

(57) ABSTRACT

The present invention discloses a biodegradable polyester composition, wherein based on a total weight of the biodegradable polyester composition, a weight content of styrene is 0.1 ppm-30 ppm. When the weight content of styrene which is added into a chosen formula of the biodegradable polyester composition based on the total weight of the biodegradable polyester composition is controlled as 0.1 ppm-30 ppm, the present invention may guarantee the biodegradable polyester composition with excellent transmittance and haze effect, and meanwhile may guarantee the biodegradable polyester composition with suitable UV resistance function, without reducing a degradation rate of the biodegradable polyester composition.

16 Claims, No Drawings

BIODEGRADABLE POLYESTER
COMPOSITION

CROSS REFERENCE TO RELATED
APPLICATIONS

The present application is a national phase entry under 35 U.S.C. § 371 of International Application No. PCT/CN2017/075357, filed Mar. 1, 2017, which claims priority from Chinese Patent Application No. 201610583504.X filed Jul. 22, 2016, all of which are hereby incorporated herein by reference.

TECHNICAL FIELD

The present invention belongs to a field of modification of macromolecule materials, and specifically relates to a biodegradable polyester composition with excellent transmittance, haze effect and suitable degradation rate.

BACKGROUND

Biodegradable polyester is a kind of macromolecule material using biological resources as raw materials. With respect to a petroleum-based polymer using petrochemical resources as raw materials, the biodegradable polyester can be degraded during a process of biological or biochemical effect or in a biological environment, being a very active degradable material in the present biodegradable plastic research and one of the best degradable materials in market application.

The biodegradable polyester, having characteristics such as soft texture, non-toxicity, being convenient to process, good chemical stability, a certain strength, very good chemical solvent resistance and cold resistance, is widely used in a field of agricultural mulching film. Owing to a special function of the agricultural mulching film, there is relatively high demand for transparency and special need for a UV resistance function. At present, a conventional method for enhancing the UV resistance function of a biodegradable polyester film is to add a certain amount of UV resistance additive, UV absorbent or UV stabilizer into the biodegradable polyester film. As in CN 103687902, UV absorbent and HALS stabilizer, or a light stabilizer combining both, is introduced and used for providing the mulching film with UV stability. However, an addition of UV resistance, UV absorbent or UV stabilizer will slow down a degradation rate of the biodegradable polyester film to some extent, resulting in that the biodegradable polyester film cannot finish degradation within an expected time, which affects renewing soil as well as cultivating crops and reduce fertility of soil to some extent.

The present invention surprisingly finds by research that by adding a trace amount of styrene into a formula of the biodegradable polyester composition, the biodegradable polyester composition is guaranteed to have excellent transmittance and haze effect, and meanwhile the biodegradable polyester composition is guaranteed to have suitable UV resistance function, without reducing the degradation rate of the biodegradable polyester composition.

SUMMARY OF THE INVENTION

An objective of the present invention is to provide a biodegradable polyester composition. By adding a trace amount of styrene into the composition, the prepared biodegradable polyester composition has excellent transmittance, haze effect and UV resistance, without reducing a degradation rate of the biodegradable polyester composition.

The above objective of the present invention is realized by following technical solution:

a biodegradable polyester composition comprises following components in parts by weight:

i) 60 to 100 parts of biodegradable aliphatic-aromatic polyester;

ii) 0 to 40 parts of polylactic acid;

iii) 0 to 35 parts of an organic filler and/or an inorganic filler.

Particularly, based on a total weight of the biodegradable polyester composition, a weight content of styrene is 0.1 ppm-30 ppm, preferably 0.5 ppm-10 ppm. The weight content of styrene means the weight content of those finally remaining in the biodegradable polyester composition.

The weight content of styrene according to the present invention is measured by following method: 1.2000 g±0.005 g of the biodegradable polyester composition is weighed accurately and added into a static headspace test flask; a peak area of styrene in the biodegradable polyester composition is measured by a static headspace method; the weight content of styrene in the biodegradable polyester composition is calculated according to the peak area of styrene in the biodegradable polyester composition and a standard curve of styrene; and the standard curve of styrene is calibrated by a solution of styrene/methanol.

Styrene is a volatile organic micromolecule solvent. After a film is prepared by blow molding of the biodegradable polyester composition which is added with a suitable weight content of styrene, a micromolecule layer will be formed on a surface of film material by a function of light. Formation of the micromolecule layer can enhance the transmittance and the haze of the film to some extent, but enhance the UV resistance function of film to some extent. Since an addition of suitable weight content of styrene doesn't change a structure or property of the biodegradable polyester composition essentially, the degradation rate of the biodegradable polyester composition will not be affected by the addition of styrene basically. But if the weight content of styrene added in the biodegradable polyester composition is more than 30 ppm, i.e. too much addition, it will result in a too large haze of film material and a decreasing transmittance of film. If the weight content of styrene added in the biodegradable polyester composition is less than 0.1 ppm, it will result in a too small thickness and uneven dispersion of the micromolecule layer of styrene, insufficient UV resistance and too fast degradation of film material. The present invention finds by research that controlling the weight content of styrene which is added into the biodegradable polyester composition as 0.1 ppm-30 ppm guarantees the biodegradable polyester composition with excellent transmittance and haze effect, and meanwhile guarantees the biodegradable polyester composition with suitable UV resistance function, without reducing the degradation rate of the biodegradable polyester composition.

A route of acquiring styrene in the present invention is by means of adding styrene or substances containing styrene (such as polystyrene, brominated polystyrene, polybromostyrene and the like) directly during blending and processing the biodegradable polyester composition, so as to adjust the weight content of styrene in the biodegradable polyester composition.

Preferably, the biodegradable polyester composition comprises the following components in parts by weight:

i) 65 to 95 parts of the biodegradable aliphatic-aromatic polyester;

ii) 5 to 35 parts of the polylactic acid;

iii) 5 to 25 parts of the organic filler and/or the inorganic filler.

Particularly, the biodegradable aliphatic-aromatic polyester is selected from one or more of poly(butyleneadipate-co-terephthalate) (PBAT), poly(butylenesuccinate-co-terephthalate) (PBST) and poly(butylenesebacate-co-terephthalate) (PBSeT).

Particularly, the organic filler is selected from one or more of natural starch, plasticized starch, modified starch, natural fiber and wood flour; and the inorganic filler is selected from one or more of talcum powder, montmorillonite, kaolin, chalk, calcium carbonate, graphite, gypsum, conductive carbon black, calcium chloride, ferric oxide, dolomite, silicon dioxide, wollastonite, titanium dioxide, silicate, mica, glass fiber and mineral fiber.

According to different needs of use, the biodegradable polyester composition according to the present invention can be further added with 0 to 4 parts of at least one of following substances: plasticizer, release agent, surfactant, wax, antistatic agent, pigment, anti-UV promoters and other plastic additives.

The plasticizer is one of or a mixture of two or more of citric esters, glycerol and epoxidized soybean oil.

The release agent is one of or a mixture of two or more of silicone oil, paraffin, white mineral oil and Vaseline.

The surfactant is one of or a mixture of two or more of polysorbate, palmitate and laurate.

The wax is one of or a mixture of two or more of erucamide, stearamide, behenamide, beeswax and beeswax ester.

The antistatic agent is a permanent antistatic agent, specifically listed as one of or a mixture of two or more of PELESTAT-230, PELESTAT-6500 and SUNNICO ASA-2500.

The pigment is one of or a mixture of two or more of carbon black, black masterbatch, titanium dioxide, zinc sulfide, phthalocyanine blue and fluorescent orange.

The anti-UV promoters include a UV absorbent and a UV stabilizer.

The UV adsorbent is one or more of UV-944, UV-234, UV531 and UV326.

The UV stabilizer is one or more of UV-123, UV-3896 and UV-328.

The other plastic additives can be nucleating agent, anti-fogging agent, lubricant (such as calcium stearate) and the like.

The transmittance of the biodegradable polyester composition is 88.5 to 94.0.

The haze of the biodegradable polyester composition is 28.59 to 33.45.

After the biodegradable polyester composition is blow molded into the film with a certain thickness, the higher the transmittance of film material is, the better for sunlight to penetrate the film material and the better for photosynthesis of plant. However, the higher the transmittance of film material is, the more obvious for UV light to penetrate. Penetration of UV light does harm to plant and will intensify the degradation of film material. Therefore, some measures of UV resistance should be done to the film material, such as adding anti-UV promoters, or enhancing the haze of film material, to reduce its transparency. Thus, in order to better use protection of film material, a relationship between the transmittance and the haze of film material needs to be balanced. And preferably, the biodegradable polyester composition with above transmittance and haze has the best protection for plant, and meanwhile the corresponding film material has suitable UV resistance function and degradation rate.

Time for thermal oxidative aging of the biodegradable polyester composition is 30 to 45 days. If the time is beyond or less than this period, it indicates that the degradation rate of the biodegradable polyester composition is too slow or too fast.

The biodegradable polyester composition in the present invention can be used for preparing shopping bag, compost bag, mulching film, protective cover film, silo film, film strip, fabric, non-fabric, textile, fishing net, bearing bag, garbage bag and the like.

Compared to the prior art, the present invention has following beneficial effects:

In the present invention, by controlling the weight content of styrene which is added into a chosen formula of the biodegradable polyester composition based on the total weight of the biodegradable polyester composition as 0.1 ppm-30 ppm, the biodegradable polyester composition is guaranteed to have excellent transmittance and haze effect, and meanwhile the biodegradable polyester composition is guaranteed to have suitable UV resistance function, without reducing the degradation rate of the biodegradable polyester composition.

DETAILED DESCRIPTION OF THE PREFERRED EMBODIMENT

The present invention will be further described below by way of specific implementations, and the following embodiments are preferred embodiments of the present invention, but the implementations of the present invention are not limited by the following embodiments.

The embodiments of the present invention employed following raw materials, but were not limited to these raw materials:

PBAT, PBST and PBSeT are chosen as a component i), PLA is chosen as a component ii), starch is chosen as a component iii) as an organic filler, talcum powder and calcium carbonate are chosen as the component iii) as inorganic fillers, citric esters is chosen as a plasticizer, calcium stearate is chosen as other plastic additive, anti-UV promoters means a UV absorbent and a UV stabilizer, and erucamide is chosen as a wax. The above-mentioned promoters, PBAT, PBST, PBSeT, PLA and styrene are commercially available.

Test Standard or Evaluation Method for Each Performance Index:

(1) Evaluation Method for a Degradation Rate of a Biodegradable Polyester Composition:

In the present invention, a compost test was replaced by a thermal oxidative aging test and the degradation rate of the biodegradable polyester composition was evaluated. By experiments, it was found that normal compost time for degradation of the biodegradable polyester composition corresponded to 30 to 45 days of time for the thermal oxidative aging. If the time was beyond or less than this period, it indicated that the degradation rate of the biodegradable polyester composition was too slow or too fast.

A method for the thermal oxidative aging test of the biodegradable polyester composition was: the biodegradable polyester composition was sealed in a non-vacuum aluminum foil bag. The aluminum foil bag was put in an air dry oven at 70° C. to perform the thermal oxidative aging test. Samples were taken every 3 days for testing a melting index (190° C./2.16 kg, according to ISO 1133). When the melting index of the sample was beyond a normal melting index range of the biodegradable polyester composition, it indicated that an obvious thermal oxidative aging degradation had occurred in the biodegradable polyester composition. A test time that the obvious thermal oxidative aging degradation occurred in the biodegradable polyester composition was recorded.

(2) Tests for Transmittance and Haze of the Biodegradable Polyester Composition:

Transmittance and haze of transparent plastic were determined according to GB/T2410-2008. A monolayer film with a thickness of 12 μm was chosen to perform determinations of transmittance and haze of the biodegradable polyester composition in the present invention.

(3) Measurement of Styrene:

1.2000 g±0.005 g of the biodegradable polyester composition was weighed accurately and added into a static headspace test flask; a peak area of styrene in the biodegradable polyester composition was measured by a static headspace method; the weight content of styrene in the biodegradable polyester composition was calculated according to the peak area of styrene in the biodegradable polyester composition and a standard curve of styrene; and the standard curve of styrene was calibrated by a solution of styrene/methanol.

Instrument models and parameters for static headspace are as follows:

Agilent Technologies 7697 Headspace Sampler;
Agilent Technologies 7890AGC System;
Chromatographic column: J&W 122-7032: 250° C.: 30 m×250 μm×0.25 μm;
Sample injection: front SS injection port $N_2$;
Sample production: front detector FID.

Embodiments 1-23 and Comparative Embodiments 1-3

According to formulas shown in Table 1, PBAT, PBST or PBSeT, PLA, organic fillers, inorganic fillers, promoters such as plasticizer, anti-UV promoters, wax, other plastic additives and the like, and styrene were mixed evenly and put into a single screw extruder. After being extruded at 140° C.–240° C. and prilled, the biodegradable polyester compositions were obtained. Data of performance tests is shown in Table 1.

TABLE 1

Component ratios (parts by weight) and test results for each performance of Embodiments 1-23 and Comparative Embodiments 1-3

| | Comparative Embodiment 1 | Comparative Embodiment 2 | Comparative Embodiment 3 | Embodiment 1 | Embodiment 2 | Embodiment 3 | Embodiment 4 | Embodiment 5 | Embodiment 6 | Embodiment 7 |
|---|---|---|---|---|---|---|---|---|---|---|
| PBAT | 84.4 | 84.4 | 84.4 | 100 | 84.4 | 84.4 | 84.4 | 84.4 | 67.5 | 67.8 |
| PBST | | | | | | | | | 32 | 15 |
| PBSeT | | | | | | | | | | 17 |
| PLA | 10 | 10 | 10 | | 10 | 10 | 10 | 10 | | |
| starch | | | | | | | | | | |
| talcum powder | 1.5 | 1.5 | 1.5 | | 1.5 | 1.5 | 1.5 | 1.5 | | |
| calcium carbonate | 3.5 | 3.5 | 3.5 | | 3.5 | 3.5 | 3.5 | 3.5 | | |
| calcium stearate | 0.1 | 0.1 | 0.1 | — | 0.1 | 0.1 | 0.1 | 0.1 | 0.2 | |
| citric esters | | | 0.8 | | | | | | | |
| anti-UV promoters | 0.5 | 0.5 | 0.5 | | | | | | 0.3 | 0.1 |
| erucamide | 0 | 0.5 | 0 | 1 | 0.5 | 0.5 | 0.5 | 0.5 | 0.5 | 0.1 |
| content of styrene/ppm | 0 | 45 | 0 | | 0.8 | 1.2 | 1.6 | 1.8 | 0.5 | 2 |
| haze | 31.28 | 27.82 | 30.21 | 32.31 | 33.43 | 32.89 | 33.40 | 33.04 | 33.45 | 32.95 |
| transmittance | 94.2 | 80.1 | 91.5 | 93.6 | 93.2 | 93.6 | 93.8 | 94.0 | 92.8 | 93.7 |
| time for thermal oxidative aging/day | 20 | 52 | 66 | 36 | 35 | 36 | 37 | 39 | 40 | 36 |

| | Embodiment 8 | Embodiment 9 | Embodiment 10 | Embodiment 11 | Embodiment 12 | Embodiment 13 | Embodiment 14 | Embodiment 15 |
|---|---|---|---|---|---|---|---|---|
| PBAT | 84.4 | 84.4 | 84.4 | 84.4 | 84.4 | 84.4 | 84.4 | 84.4 |
| PBST | | | | | | | | |
| PBSeT | | | | | | | | |
| PLA | 10 | 10 | 10 | 10 | 10 | 10 | 10 | 10 |
| starch | | | | | | | | |
| talcum powder | 1.5 | 1.5 | 1.5 | 1.5 | 1.5 | 1.5 | 1.5 | 1.5 |
| calcium carbonate | 3.5 | 3.5 | 3.5 | 3.5 | 3.5 | 3.5 | 3.5 | 3.5 |
| calcium stearate | 0.1 | 0.1 | 0.1 | 0.1 | 0.1 | 0.1 | 0.1 | 0.1 |
| citric esters | | | | | | | | |
| anti-UV promoters | 0.5 | 0.5 | 0.5 | 0.5 | 0.5 | 0.5 | 0.5 | 0.5 |
| erucamide | 2.5 | 5 | 8 | 8.5 | 9 | 10 | 0.1 | 30 |
| content of styrene/ppm | 31.56 | 31.54 | 31.32 | 29.86 | 29.42 | 29.02 | 28.59 | 28.61 |
| haze | 91.8 | 91.9 | 91.1 | 89.7 | 89.6 | 89.5 | 88.7 | 88.5 |
| transmittance | 40 | 41 | 42 | 42 | 42 | 43 | 31 | 45 |
| time for thermal oxidative aging/day | | | | | | | | |

TABLE 1-continued

Component ratios (parts by weight) and test results for each performance of Embodiments 1-23 and Comparative Embodiments 1-3

| | Embodiment 16 | Embodiment 17 | Embodiment 18 | Embodiment 19 | Embodiment 20 | Embodiment 21 | Embodiment 22 | Embodiment 23 |
|---|---|---|---|---|---|---|---|---|
| PBAT | 84.4 | 84.4 | 84.4 | 84.4 | 84.4 | 84.4 | 84.4 | 84.4 |
| PBST | | | | | | | | |
| PBSeT | | | | | | | | |
| PLA | 10 | 10 | 10 | 10 | 10 | 10 | 10 | 10 |
| starch | | | | | | | | |
| talcum powder | 1.5 | 1.5 | 1.5 | 1.5 | 1.5 | 1.5 | 1.5 | 1.5 |
| calcium carbonate | 3.5 | 3.5 | 3.5 | 3.5 | 3.5 | 3.5 | 3.5 | 3.5 |
| calcium stearate | 0.1 | 0.1 | 0.1 | 0.1 | 0.1 | 0.1 | 0.1 | 0.1 |
| citric esters | | | | | | | | |
| anti-UV promoters | | | | | | | | |
| erucamide | 0.5 | 0.5 | 0.5 | 0.5 | 0.5 | 0.5 | 0.5 | 0.5 |
| content of styrene/ppm | 0.8 | 2.5 | 8.5 | 0.1 | 0.8 | 2.5 | 8.5 | 0.1 |
| haze | 33.12 | 31.16 | 29.65 | 28.87 | 33.23 | 31.35 | 29.32 | 28.64 |
| transmittance | 92.8 | 91.7 | 89.4 | 88.5 | 92.9 | 91.2 | 89.2 | 88.6 |
| time for thermal oxidative aging/day | 36 | 38 | 42 | 32 | 35 | 39 | 41 | 32 |

It can be seen from Table 1 that when the weight content of styrene in the biodegradable polyester composition is 0.1 ppm-30 ppm, the biodegradable polyester composition is guaranteed to have excellent transmittance and haze effect, and meanwhile the biodegradable polyester composition is guaranteed to have suitable UV resistance function, without reducing the degradation rate of the biodegradable polyester composition. In Comparative Embodiment 1 in which styrene hasn't been added, when the weight content of styrene is 0 ppm, though the biodegradable polyester composition has relatively high transmittance and haze, the time for thermal oxidative aging is too short, indicating that the degradation rate of a polymer composition is fast. In Comparative Embodiment 2, when the weight content of styrene is more than 30 ppm, the time for thermal oxidative aging of the biodegradable polyester composition is too long, indicating that the degradation rate of the composition is too slow and the transmittance and haze effect of the polymer composition are relatively poor. In Comparative Embodiment 3 in which styrene hasn't been added and the anti-UV promoters has been added only, though the biodegradable polyester composition has suitable transmittance and haze, but the time for thermal oxidative aging is too long, indicating that the degradation rate of the polymer composition is too slow.

What is claimed:

1. A biodegradable polyester composition, characterized in that, it comprises following components in parts by weight:
   i) 60 to 100 parts of a biodegradable aliphatic-aromatic polyester;
   ii) 0 to 40 parts of a polylactic acid;
   iii) 0 to 35 parts of an organic filler and/or an inorganic filler; and
   wherein based on a total weight of the biodegradable polyester composition, a weight content of styrene is 0.1 ppm-30 ppm.

2. The biodegradable polyester composition according to claim 1, wherein based on the total weight of the biodegradable polyester composition the weight content of styrene is 0.5 ppm-10 ppm.

3. The biodegradable polyester composition according to claim 2, wherein it comprises the following components in parts by weight:
   i) 65 to 95 parts of the biodegradable aliphatic-aromatic polyester;
   ii) 5 to 35 parts of the polylactic acid;
   iii) 5 to 25 parts of the organic filler and/or the inorganic filler.

4. The biodegradable polyester composition according to claim 1, wherein the biodegradable aliphatic-aromatic polyester is selected from one or more of poly(butyleneadipate-co-terephthalate) (PBAT), poly(butylenesuccinate-co-terephthalate) (PBST) and poly(butylenesebacate-co-terephthalate) (PBSeT).

5. The biodegradable polyester composition according to claim 1, wherein the organic filler is selected from one or more of natural starch, plasticized starch, modified starch, natural fiber and wood flour; and the inorganic filler is selected from one or more of talcum powder, montmorillonite, kaolin, chalk, calcium carbonate, graphite, gypsum, conductive carbon black, calcium chloride, ferric oxide, dolomite, silicon dioxide, wollastonite, titanium dioxide, silicate, mica, glass fiber and mineral fiber.

6. The biodegradable polyester composition according to claim 1, wherein it further comprises 0 to 4 parts of at least one of following substances: plasticizer, release agent, surfactant, wax, antistatic agent, pigment, anti-UV promoters and other plastic additives.

7. The biodegradable polyester composition according to claim 2, wherein a transmittance of the biodegradable polyester composition is 88.5 to 94.0.

8. The biodegradable polyester composition according to claim 2, wherein a haze of the biodegradable polyester composition is 28.59 to 33.45.

9. The biodegradable polyester composition according to claim 2, wherein time for thermal oxidative aging of the biodegradable polyester composition is 30 to 45 days.

10. The biodegradable polyester composition according to claim 2, wherein the biodegradable aliphatic-aromatic polyester is selected from one or more of poly(butyleneadipate-co-terephthalate) (PBAT), poly(butylenesuccinate-co-terephthalate) (PBST) and poly(butylenesebacate-co-terephthalate) (PBSeT).

11. The biodegradable polyester composition according to claim 2, wherein the organic filler is selected from one or more of natural starch, plasticized starch, modified starch, natural fiber and wood flour; and the inorganic filler is selected from one or more of talcum powder, montmorillonite, kaolin, chalk, calcium carbonate, graphite, gypsum, conductive carbon black, calcium chloride, ferric oxide, dolomite, silicon dioxide, wollastonite, titanium dioxide, silicate, mica, glass fiber and mineral fiber.

12. The biodegradable polyester composition according to claim 2, wherein it further comprises 0 to 4 parts of at least one of following substances: plasticizer, release agent, surfactant, wax, antistatic agent, pigment, anti-UV promoters and other plastic additives.

13. The biodegradable polyester composition according to claim 1, wherein it comprises the following components in parts by weight:
   i) 65 to 95 parts of the biodegradable aliphatic-aromatic polyester;
   ii) 5 to 35 parts of the polylactic acid;
   iii) 5 to 25 parts of the organic filler and/or the inorganic filler.

14. The biodegradable polyester composition according to claim 1, wherein a transmittance of the biodegradable polyester composition is 88.5 to 94.0.

15. The biodegradable polyester composition according to claim 1, wherein a haze of the biodegradable polyester composition is 28.59 to 33.45.

16. The biodegradable polyester composition according to claim 1, wherein time for thermal oxidative aging of the biodegradable polyester composition is 30 to 45 days.

* * * * *